A. F. VOGT.
ATTACHMENT FOR ANIMAL TRAPS.
APPLICATION FILED OCT. 31, 1913.
1,092,612.
Patented Apr. 7, 1914.
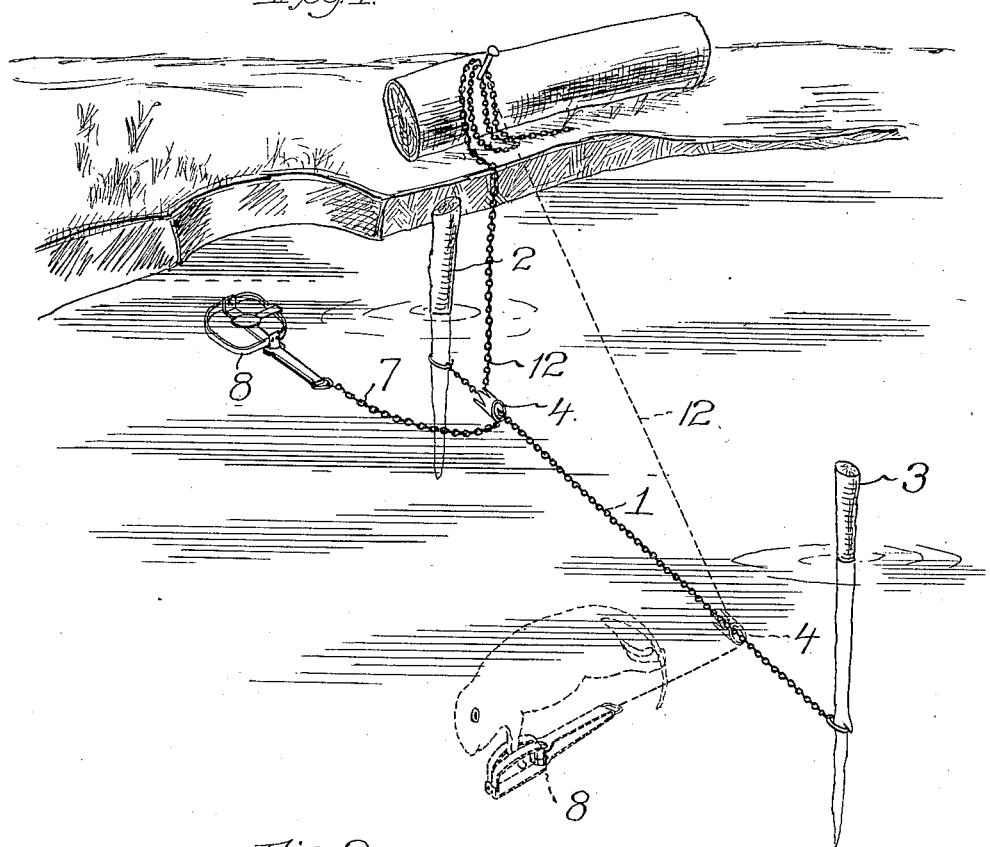
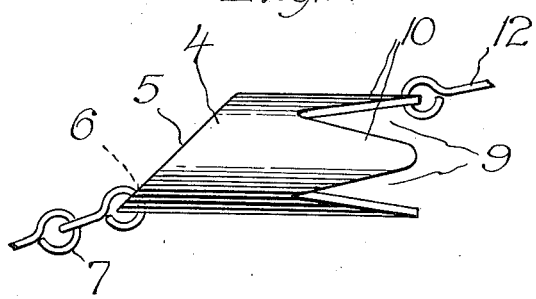
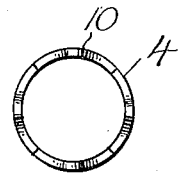
Inventor
Adelbert F. Vogt
Witnesses

UNITED STATES PATENT OFFICE.

ADELBERT F. VOGT, OF DETROIT, MICHIGAN.

ATTACHMENT FOR ANIMAL-TRAPS.

1,092,612. Specification of Letters Patent. Patented Apr. 7, 1914.

Application filed October 31, 1913. Serial No. 798,437.

*To all whom it may concern:*

Be it known that I, ADELBERT F. VOGT, a citizen of the United States of America, residing at Detroit, in the county of Wayne and State of Michigan, have invented certain new and useful Improvements in Attachments for Animal-Traps, of which the following is a specification, reference being had therein to the accompanying drawings.

This invention relates to attachments for animal traps, of that type generally employed for catching arvicoline aquatic animals which inhabit the banks of rivers and streams.

My invention aims to provide a device that permits of the traps being set whereby an animal can carry the same into deep water, but the device restraining and holding the trap against movement by an animal shoreward or to shallow water. In this connection the attachment has been primarily designed for use in connection with traps employed for catching muskrats, beavers, and other aquatic animals that generally come to shore to obtain food. Baited traps are used and often set and anchored in such a manner that the animals caught in the traps can carry the same into deep water in an endeavor to escape, and to prevent the animal from carrying the trap into shore, I have devised a novel attachment that retains the trap in deep water until such time as it is manually removed, thereby causing an entrapped animal to be drowned. To this end a line extends from shallow water into deep water and movable upon the line is a pronged sleeve to which is attached a trap and a hauling-in line. The sleeve is adapted to engage the line and prevent shoreward movement by an entrapped animal, but through the medium of the hauling-in line the trap can be manually moved shoreward and reset.

My invention will be hereinafter specifically described and then claimed and reference will now be had to the drawing wherein, Figure 1 is a view illustrating the attachment with a set trap; Fig. 2 is an enlarged side elevation of the attachment, and Fig. 3 is an end view of the same.

In the drawing 1 denotes a chain or line that extends from shallow water to deep water. The ends of the line are suitably anchored, as by stakes 2 and 3, the stakes 2 being located in shore or upon the shore whereby it can be easily reached. Slidably mounted upon the chain or line 1 is a sleeve 4 having the end thereof beveled or cut at an inclination, as at 5 and provided with an opening 6. Loosely mounted in the opening 6 is a link or strap chain 7 to which is attached a trap 8 of the well known jaw type. The inner end of the sleeve 4 is provided with V-shaped slots or notches 9 that are equally spaced and the material between said slots or notches forms prongs 10. One of the prongs is apertured as at 11, and connected to said prongs is a hauling-in chain or line 12, the end of which is connected to the stake 2 or suitably anchored on shore whereby it will be within easy reach when it is desired to move the trap 8 shoreward to obtain an entrapped animal or to examine or bait the trap. When the trap is baited it is set in shallow water adjacent to the stake 2. When an animal is trapped, and plunges into deep water, the sleeve 4 slides upon the chain or line 1, the movement of the sleeve being limited by the stake 3 or by the hauling-in line 12. When an entrapped animal attempts to carry the trap shoreward, the prongs 10 of the sleeve 4 engage in the links of the chain 1 and prevent such movement, consequently the entrapped animal is drowned in deep water. By manipulating the hauling-in line 12, the prongs of the sleeve 4 can be disengaged from the links of the chain and the sleeve pulled shoreward into shallow water or upon the shore, thus permitting of the animal being removed and the trap again set. In event of either end of the chain or line 1 becoming disengaged from the anchor, the hauling in chain or line 12 prevents an animal from carrying off the trap.

From the foregoing it will be observed that I have devised a simple and inexpensive trap attachment which permits an animal to seek deep water but prevents a shoreward movement in consequence of which the animal is drowned.

What I claim is:—

1. In an attachment for traps, the combination with an anchor line, and a trap, of a sleeve slidable upon said line and connected with said trap, means carried by said sleeve and adapted to engage said line to restrain movement of said sleeve in one direction upon said line, and a hauling-in line connected with said sleeve.

2. In an attachment for traps, the combination with an anchored chain, and a trap, of a sleeve slidable upon said chain and connected with said trap, means carried by said sleeve and adapted to engage said chain to restrain movement of said sleeve in one direction upon said chain, and a hauling-in line connected with said sleeve.

3. In an attachment for traps, the combination with an anchored chain and a trap, of a sleeve slidably mounted upon said chain and connected with said trap, prongs carried by said sleeve and adapted to engage said chain, and a hauling-in line attached to one of said prongs.

4. The combination with a trap, a submerged anchor line, a sleeve slidably mounted upon said line and connected with said trap, means carried by an end of said sleeve to engage the line and prevent a shoreward movement of the sleeve and the trap attached thereto, and manually operated means connected to said sleeve and adapted to release said means whereby said sleeve may be moved shoreward.

5. In an aquatic trap, a combination with an anchoring element, of a pronged device freely movable in one direction upon said anchoring element, and manually operated means connected with said device for moving the same in an opposite direction on said anchoring element.

6. In an attachment for traps, the combination with an anchoring line, of a sleeve through which the line extends, said sleeve being formed with V-shaped notches at one end to engage and grip the line.

7. In an attachment for traps, the combination with an anchoring line, of a sleeve through which the line extends, said sleeve being of greater internal diameter than said line to permit a lateral tilting of said sleeve upon the line, prongs on one end of said sleeve forming V-shaped notches to receive and grip the line when the sleeve is tilted thereon, and means at the opposite end of said sleeve for the attachment of a trap thereto.

In testimony whereof I affix my signature in presence of two witnesses.

ADELBERT F. VOGT.

Witnesses:
 LEWIS E. FLANDERS,
 ANNA M. DORR.

---

Copies of this patent may be obtained for five cents each, by addressing the "Commissioner of Patents, Washington, D. C."